United States Patent [19]

Pusch et al.

[11] 4,340,634
[45] Jul. 20, 1982

[54] HEAT-REFLECTIVE WALL-PAPER OR WALL LINER

[76] Inventors: Günter Pusch, Postfach 49, Bannholzweg 12, 6903 Neckargemünd-Dilsberg; Dieter E. Aisslinger, Heidestr. 54, 6222 Geisenheim; Alexander Hoffmann, Heidelberger Str. 24, 6901 Mauer; Klaus-Werner Pusch, Bannholzweg 12, 6903 Neckargemünd-Dilsberg, all of Fed. Rep. of Germany

[21] Appl. No.: 137,507

[22] Filed: Apr. 4, 1980

[30] Foreign Application Priority Data

Apr. 10, 1979 [DE] Fed. Rep. of Germany ....... 2914436
Jul. 17, 1979 [DE] Fed. Rep. of Germany ....... 2928848

[51] Int. Cl.³ .......................... B32B 3/10; B32B 3/28
[52] U.S. Cl. ............................. 428/134; 428/138; 428/155; 428/178; 428/182; 428/336; 428/340; 428/343; 428/913

[58] Field of Search ............... 428/211, 209, 913, 918, 428/178, 343, 332, 461, 457, 136, 134, 138, 920, 340, 346; 427/162, 250

[56] References Cited

U.S. PATENT DOCUMENTS 2,774,421 12/1956 Lion .................................... 428/918
4,296,162 10/1981 Jean .................................... 428/213

FOREIGN PATENT DOCUMENTS 667123 6/1939 Fed. Rep. of Germany .
800857 12/1950 Fed. Rep. of Germany .
7343047 12/1973 Fed. Rep. of Germany .

*Primary Examiner*—Paul J. Thibodeau
*Attorney, Agent, or Firm*—Michael N. Meller; Anthony H. Handal

[57] ABSTRACT

A heat reflecting wall-paper comprising a base of carrier material with a vapor deposited, but discontinuous surface metal layer thereon so as to be substantially non-electrically conductive and covered with a veneer layer and thereon a veneer protection layer.

11 Claims, 3 Drawing Figures

HEAT-REFLECTIVE WALL-PAPER OR WALL LINER

BACKGROUND OF THE INVENTION

1. Field of the Invention

This invention relates to a heat-reflecting wall-cover comprising an adhesive-coated carrier material of paper or plastic provided on one or both sides with a thin vapor-deposited metal layer covered by a veneer protection layer. Wall liners of this type are generally employed in the building industry and heating technology.

2. Description of the Prior Art

German Utility Model No. 7,343,047 already discloses a known wall liner material comprising a hard foamed layer with an aluminum layer attached thereto. The outer surface of the aluminum layer may be embellished by an embossed pattern and provided with a protective veneer coating to obtain dirt-repellent properties.

German Pat. No. 677,123 teaches a metallized wallpaper, in which the metallic surface layer as well as the underlying intermediate paper layer are provided with aligned perforations in order to achieve improved moisture permeability, the two interconnected and perforated layers being attached to a further non-perforated paper base layer.

German Pat. No. 800,857 also show a metallized wall-paper of the above defined type, this wall-paper being provided with a very thin veneer layer which may or may not be colored in any manner.

These prior art wall-papers have in common the disadvantage that they are not able to effect optimum heat reflection when having colored coatings. On the other hand, the metal layer must be provided with a colored coating, otherwise the glossy metallic surfaces are not accepted for the decoration of normal dwelling spaces for esthetic reasons.

OBJECTS AND SUMMARY OF THE INVENTION

It is therefore an object of the present invention to provide an improved heat-reflecting wall-cover in the form of a wall-cover. Optimum dimensioning of the wallpaper results not only in the best heat insulation, or reflection, respectively, but also provides an aesthetically pleasant surface, while simultaneously eliminating the unpleasantness associated the electric conductivity of a metallized wall-paper.

In accordance with the invention, this object is attained by the combination of the following characteristics:

(a) that a metal layer is deposited on said carrier material and serves to reflect infrared (heat) radiation having a thickness of less than 30 nanometer;

(b) that a veneer protection layer for protecting the metal layer against corrosion and/or promoting adhesiveness is applied onto said metal layer in a thickness of several $\mu$m, and (c) that a veneer substantially transparent in the wavelength range of 4 to 20 $\mu$m, but appearing colored in the range $\lambda=0.4$ to 0.8 $\mu$m, is applied onto said veneer protection layer in a thickness of several 10 $\mu$m.

It is generally known that, due to the high density of free electrons, metal layers are able to reflect electromagnetic radiations at layer thicknesses considerably smaller than the wavelength of the radiation. A suitable thickness of an aluminum layer i.e., the metal most frequently used for vapor depositing, is 14 nanometers. In order to also include other metals and to make allowance for irregularities in the vapor-deposited layer, the thickness thereof has been established at 30 nanometer. Layers of greater thickness are also possible, a greater thickness does not, however, result in a further improved reflectivity. On the other hand, a greater thickness of the layer requires a greater amount of material to be vapor-deposited, resulting in an unnecessary increase of the production cost. In the case of greater thickness of this layer, it is moreover no longer ensured that the metal layer is effectively broken up into numerous small islands by rolling the wall-cover or by stretching or otherwise deforming the carrier material. It is only if this break-up of the metal layer is achieved to a sufficient degree, however, that the metallic layer loses its undesirable conductivity.

The selection of an extremely thin metal layer with a maximum thickness of 30 nanometer ensures on the one hand a maximum reflection of thermal energy, while on the other, that the completed wall-cover is not appreciably stiffened by the metal layer, but retains the customary flexibility of conventional wall-papers, so that it can be handled without difficulty. There is thus obtained with a minimum expenditure of material a wallpaper of maximum reflectivity which is practically indistinguishable from conventional wall-papers with respect to its handling properties.

A metal layer of the above defined type initially has very high conductivity for low-frequency alternating currents and direct currents, so that it is very dangerous if a wall lining provided with such metal layer inadvertently comes in contact with electrical wiring.

Accordingly, in order to eliminate this potential danger a further advantageous feature of the invention provides that the carrier material with the metal layer deposited thereon is stretched or deformed to such an extent that the stretching of the metal layer results in the formation of hairline cracks which practically eliminate the surface conductivity of the metal layer. This is made possible by employing an extremely thin metal layer which is readily torn apart to numerous small islands by mechanical processing of the wall-paper, such as by embossing, after the metal layer has been vapor-deposited thereon. The extremely small islands formed in this manner are separated from one another by cracks having widths in the micrometer range, whereby the electrical conductivity of the layer is substantially lost.

Deformation of the carrier material is preferably carried out only after at least the veneer layer has been applied to the metal layer. This is necessary, since the veneer protection layer has to be applied in a very thin layer, which would be more difficult after the deformation step. If the veneer protection layer is, for instance, a polyester layer, its dielectric strength lies above 100 V/$\mu$m. Thus one obtains a wall-paper capable of optical reflection of thermal radiation, which is generally indistinguishable from conventional wall-papers as regards its stiffness, and which does not involve the danger of electrical short-circuits as is the case with conventional metallized wall-papers.

The thickness of the veneer protection layer (3) which also serves as a primer for the covering veneer layer (4) is selected so that it becomes substantially free of pores by repetitive application so as to prevent corrosion of the metal layer (2). At the same time, it remains highly transparent over the entire spectral range of thermal radiation. Depending on the type of veneer and the method of application, this thickness lies within the range of a few μm.

A main reason for employing wall-papers and liners is the decoration of walls and/or ceilings. Appearance of the wall-paper must not be affected to any appreciable degree by other functions, even if these, as in the present case, result in considerable improvements in quality and/or energy savings.

It is therefore essential that the originally metallic-looking wall paper can be provided with any selected color. Conventional wall paints are based, however, on binders having very pronounced infrared absorption properties. These paints are applied in uncontrollable thickness ranges and contain pigments, the selection and particle size of which, is solely governed by visual criteria. In the wavelength range of thermal radiation these paints therefore have an absorbent effect, i.e. they give a "black" or "cold" impression.

In order to retain the high thermal reflectivity and thus the cosy and energy-saving effects of a metallized wall lining, the color applied with the veneer layer (4) has to be substantially transparent in the wavelength range of 4 to 20 μm. This is obtained by employing binders having no appreciable absorption properties within this range and containing dissolved coloring agents which are likewise transparent in this spectral range and/or pigments the coloring of which is independent of their particle size. Known binders which are transparent in the infrared range are for instance polymethylene of diazo methane, low density polyethylene, high density polyethylene, isomerized caoutchouc (cyclocaoutchouc), various polyamides, low-molecular acrylates etc. The total infrared absorption of layers of these materials having a thickness of 10 μm is less than 10%.

The thickness of the veneer protection layer should be selected to be as small as possible, preferably not greater than λ/4 as referred to the shortest relevant wavelength. A coating thickness of for instance 0.5 μm has been found to be particularly suitable. This layer may consist of the same binder materials as employed for the veneer coating, such as polymethyl acrylate.

For coloring the binder layer, forming the veneer coating, use is preferably made of coloring agents which are transparent in the infrared range, such as alizarine or azo dyes.

If pigment particles are employed in the binder coating in order to adapt this layer for use as a priming coat, such pigment particles should all have a diameter of less than 1 μm. Thus for instance the size distribution of the pigment particles which has been found suitable, is one in which the particle diameters are in a Gauss distribution of about 0.35 μm. The ratio of binder to pigment particles should be selected as large as possible, and the coating thickness of the veneer as small as possible. Preferably the coating thickness and the binder/pigment ratio are selected such that an average of about two pigment particle strata are loosely imbedded in the binder, resulting in a high transparency of the veneer layer over the entire relevant infrared range. An acceptable thickness of this layer lies for instance within the order between 1.5 to 20 μm. Suitable pigments are substances lacking infrared molecule resonance. Such resonances are characteristic for instance in organic substances including radicals. Preferably suitable are inorganic pigment compositions such as $TiO_2$.

The combined effect of colored pigments with a coloring by means of soluble dyes in the binder coating in accordance with the above described principle may result in various coloring effects within the optical range, offering a wide freedom of choice for colored designs.

The invention also recognizes that a heat reflecting wall-paper or a corresponding wall lining will only be economically useful if it is in fact accepted by the consumer. This can only be achieved if the wall-paper can be processed in accordance with conventional techniques, i.e. without additional expenditure and without expensive methods, for instance without the requirement of special adhesives, and if the wall-paper or wall liner can be printed with the customary patterns, it can then conform to the requirements of the market.

These requirements can be satisfied by a heat-reflecting wall-paper, comprising of a carrier material consisting of a thin special paper covered with a thin primer veneer coating. A metal layer; a veneer protection layer; and a veneer coating thereon. The carrier material can then be attached to a wall-paper base by means of an adhesive lining.

Wall-papers of this type may readily be processed in accordance with conventional wallpapering methods. Moreover, the outer face of the wall-paper may be printed with customary designs or patterns by conventional printing methods. Both of these properties make the wall-paper acceptable to the consumer, so that it is willingly employed, whereby the desired economical benefit, namely, a saving of heating energy, is also accomplished. Since the wall-paper can be printed with the customary designs or patterns, it provides the same aesthetic qualities as hitherto known wall-papers, within the additional advantage that a considerable amount of energy is saved for room heating.

As the metal layer of the wall-paper is extremely thin, fulling and rolling of the wall-paper in the conventional manner will cause it to be torn, whereby the wall-paper as a whole becomes permeable to water vapor. This results in the additional advantage that the wall-paper, although reflecting at least 60% of the heat radiation, does not act as a steam barrier, but permits a moisture exchange with the underlying wall. This promotes the attaining of a room atmosphere similar to that achieved with conventional wall-papers.

In a preferred embodiment of the invention, the veneer coating is replaced by a single- or multicolored print, the colors of which are substantially transparent in the range of 4 to 20 μm, with the veneer protection layer serving as a prime for the color print.

In contrast to a veneer coating, this alternative offers the advantage that the customary printing methods applied in the production of wall-papers may be employed. The visible or outer face may be decorated with any desired design, so as to avoid the metallic look shown by conventional thermally reflective wall-papers. The printed design does not affect, to any appreciable degree, the high reflectivity in the wavelength range of 5 to 25 μm. Suitable selection of pigments and binders permits different colors and patterns to be printed in a single operation or in consecutive steps.

The above described printing operation is preferably carried out on the above described special paper prior to its attachment to the wall-paper base.

In order to facilitate processing of the wall-paper in accordance with conventional techniques, the wall-paper base is selected in the weight range of 100 to 200 g/m², the metal-coated thin special paper is selected in the weight range of 10 to 50 g/m², and the adhesive lining is applied therebetween in a thickness of about 10 μm. This combination of layers has already been successfully put to practical tests. During development of the wall-paper, according to the invention, it was found that the adhesive lining, which originally has been solely intended for bonding the wall-paper base to the carrier material, is preferaby selected such that it additionally performs the following functions:

1. The adhesive lining, which consists for instance of polyvinyl chloride and is used in the finished wall-paper to bond the wall-paper base to the special paper, so that it extends in the mechanically neutral zone, is preferably of a soft or flexible material so as to improve the pliancy and flexibility of the finished wall-paper. This enables the hobby craftsman to attach the wall-paper to a wall without difficulty.
2. By selecting a suitable chemical composition for the adhesive lining, the combustibility and inflammability of the wall-paper can be reduced.
3. The chemical composition of the adhesive lining is preferably selected such that it protects the metal layer from corrosion by alkaline substances exuded by an underlying wall.

If a room is lined with a wall-paper of the described type, the so-called "cold veil" is avoided (cf. Energy Saving Tips, vol. 2, published by the Bavarian Ministry for Commerce and Traffic, Sep. 1978).

Depending on their surface temperature and emission properties, outside walls absorb the body heat of inhabitants. If this heat is reflected by the wall-paper, it induces a radiation climate within the room, so that the required comfort is ensured even at lower room temperatures.

This effect is of considerable economic importance, as it permits the air and room temperature of heated spaces to be lowered by at least 2° to 5° C., without undesirable physiological effects.

In generally accessible publications, it has been stated that a lowering of room temperature by 3° C. results in a 18 p.c. saving of heating material, which is of considerable importance in the present situation.

A particularly pleasant room climate is ensured by the fact that the metal layer is extremely thin, so that it is torn during rolling of the wall-paper, whereby the wall-paper as a whole becomes permeable to water vapor.

BRIEF DESCRIPTION OF THE DRAWINGS

Preferred embodiments of the invention shall now be described in detail with reference to the accompanying drawings, in which.

Figure 1:
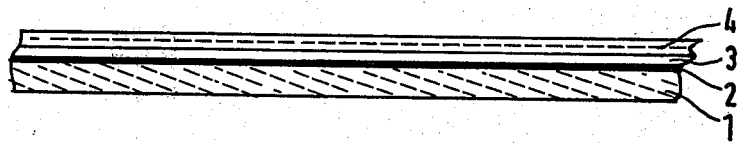
FIG. 1 shows a sectional view of a wall-paper in a first embodiment of the invention.

A wall paper shown in FIG. 1 comprises a carrier material 1, preferably a paper-based material, to which a very thin metal layer 2 is applied, preferably by vapor deposition. Prior to further processing, the compound material formed of carrier material 1 and metal layer 2 is subjected to mechanical treatment, preferably by embossing or punching, causing the metal layer 2 to be torn to numerous small islands. A thin veneer protection layer 3 is then applied onto metal layer 2. The outer surface of the veneer protection layer 3 is then provided with a veneer coating 4 of, for instance, a binder containing dyestuffs or pigments dissolved or dispersed therein.

The basic object of a wall lining material of this type is to conserve thermal energy within a room by reflecting it from walls, so that it is not lost be heating only the walls themselves.

Figure 2:
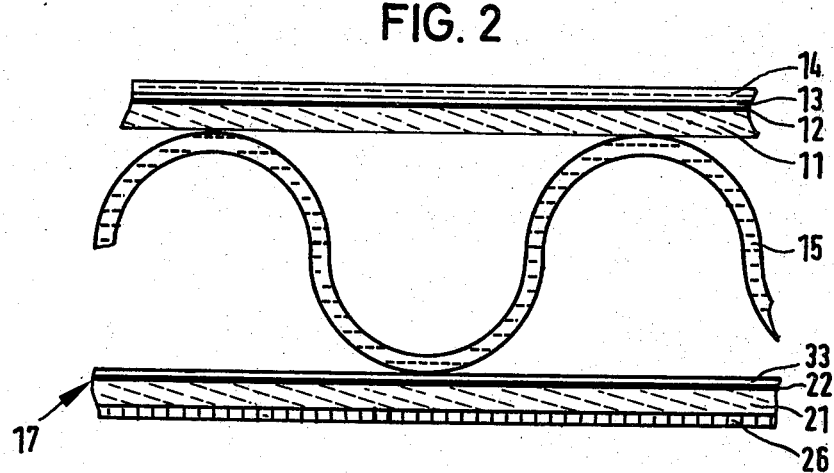
FIG. 2 shows a sectional view of a wall-paper in a second embodiment of the invention.

This effect can be further increased by bonding the wall-paper of FIG. 1, including layers 1 to 4, to an embossed, nap-patterned or corrugated thermally insulating web 15 containing air spaces and provided with an adhesive layer 16 on its rear surface as shown in FIG. 2. In this figure, layers 1 to 4 of the wall-paper shown in FIG. 1 are designated by the numerals 11 to 14.

As shown in the embodiment of FIG. 2, the insulating web 15 may also be bonded to a multi-layered carrier 17 consisting of a carrier material 21 provided with a metal layer 22 and a veneer coating 33 deposited thereon, the free surface of the carrier material being provided with an adhesive layer 26 for bonding the wall-paper or wall liner to a wall. The arrangement shown in FIG. 2 thus practically consists of two layered webs formed of layers 11 to 14 and 21 to 33, respectively, interconnected by means of an embossed, nap-patterened or corrugated intermediate carrier 15 of paper or plastic enclosing a plurality of air or gas spaces. In this arrangement, it is obviously not necessary to apply the decorative veneer coating 14 to the backing layers of this compound material. A material of this type is also effective to reduce thermal conductivity, so that heating of the wall by conduction is considerably reduced.

As evident from the foregoing description, the invention provides a color-decorated or printed wall-paper or wall lining material having a reflectivity for infrared radiation of more than 60 p.c. Hitherto known printed or otherwise colored wall-papers have a reflectivity for infrared radiation of no more than 5 to 10 p.c.

Figure 3:
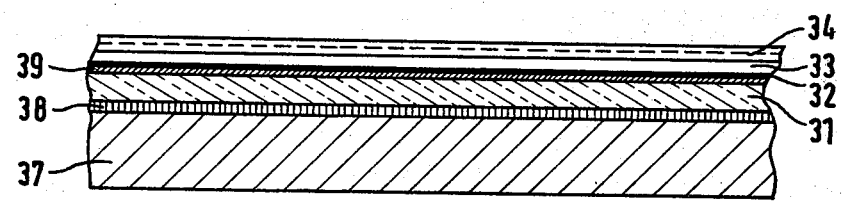
FIG. 3 shows a sectional view of a wall-paper in a third embodiment of the invention.

In the embodiment of the invention shown in FIG. 3, a wall-paper comprises a wall-paper base 37 provided with an adhesive lining 38, onto which a thin layer of a special paper 31 is applied. On its free surface, special paper layer 31 carries a priming layer 39 with a thin metal layer 32 of for instance aluminum vapor-deposited thereon. The metal layer 32 carries a thin veneer protection layer 33 covered by a finishing veneer coating 4. As already stated above, the veneer coating may be in the form of a mono- or polychrome color print, in which case the veneer protection layer 33 serves as a primer for the color print.

DESCRIPTION OF THE PREFERRED EMBODIMENT

A preferred wall-paper structure shall now be described by way of example, with a plurality of layers designated a to g from the rear surface to the front surface of the wall-paper:

(a) a wall-paper base having a weight of 150 g/m²,
(b) an adhesive lining of polyvinyl chloride having a thickness of 10 μm,
(c) a special moisture-resistant paper having a weight of 50 g/m² provided with a veneer layer of PVC copolymer having a thickness of 1.5 μm,
(d) an aluminum layer having a thickness of 20 nm,
(e) veneer layer of PVC copolymer having a thickness of 0.5 μm,
(f) a veneer coating comprising a binder layer of polymethacrylate having a thickness of 2 μm. Dispersed in the binder layer are $TiO_2$ pigment particles having diameters of less than 1 μm. the binder/pigment weight ratio is 50%.
(g) The veneer layer is printed with an alizarine dye diffusing therein, having a thickness of 2 μm.

The foregoing description of the invention has been presented describing certain operable and preferred embodiments. It is not intended that the invention should be so limited since variations and modifications thereof will be obvious to those skilled in the art, all of which are within the spirit and scope of this invention.

We claim:

1. A heat-reflecting wall-cover comprising
   (a) a carrier material having
   (b) a thin vapor-deposited metal layer deposited on said carrier material, said metal layer and carrier material both being deformed to such a degree so as to produce the formation of hairline cracks eliminating the surface electrical conductivity of the metal layer, and said metal layer serving to reflect infrared radiation in a thickness of less than 30 nanometer,
   (c) a veneer protection layer for protecting the metal layer against corrosion and promoting adhesiveness applied onto said metal layer in a thickness ranging from about 0.5 to 2.0 μm, and
   (d) a veneer which is substantially transparent in the wavelength range of 4 to 20 μm, but which appears colored in the range λ=0.4 to 0.8 μm, applied onto said veneer protection layer in a thickness of 1.5 to 20 μm.

2. A wall-cover as in claim 1, wherein said infrared-permeable, but visually opaque veneer consists of an infrared-permeable plastic containing at least one coloring agent absorbing only visible light dissolved therein.

3. A wall-cover as in claim 2, wherein the infrared-permeable plastic layer contains imbedded therein pigments producing a color effect within the visible light spectrum.

4. A wall-cover as in claim 1, wherein two or more layers of said carrier material are interconnected by means of non-planar intermediate layers thus providing enclosed gas spaces between said layers of carrier material.

5. A wall-cover as in claim 1, wherein said carrier material consists of a thin paper in the weight range of 10 to 50 $g/m^2$ covered with a primer veneer layer onto which is applied said metal layer.

6. A wall-cover as in claim 1, wherein said veneer is applied in the form of single- or multicolored print, the colors of which are substantially transparent in the wavelength range of 4 to 20 μm, and with said veneer protection layer serving as a primer for said color print.

7. A wall-cover as in claim 1, wherein said veneer comprises different color tones and patterns produced in one or more printing operations by suitable selection of color pigments and carriers.

8. A wall-cover as in claim 5, which further comprises a wall cover base having a weight in the range of 100 to 200 $g/m^2$ adhered to said carrier by means of an intermediate lining having a thickness of about 10μ.

9. A wall-cover as in claim 8, wherein the adhesive lining consists of a plastic layer which because of its elasticity, provides flexibility to the wall-cover, reduces combustibility because of its chemical composition, and protects the vapor-deposited metal layer from alkaline substances exuded by a wall.

10. A wall-cover as in claim 9, wherein said plastic layer is made of polyvinyl chloride.

11. A wall-cover as in claim 1 which is wall paper.

* * * * *